(12) United States Patent
Hagler

(10) Patent No.: US 8,467,907 B2
(45) Date of Patent: Jun. 18, 2013

(54) AUTOMATED VALVE WITH SELF-CONTAINED VALVE ACTUATOR SYSTEM

(75) Inventor: Charles Hagler, Spring, TX (US)

(73) Assignee: Certus Process Solutions, Houston, TX (US)

( * ) Notice: Subject to any disclaimer, the term of this patent is extended or adjusted under 35 U.S.C. 154(b) by 575 days.

(21) Appl. No.: 12/688,912

(22) Filed: Jan. 18, 2010

(65) Prior Publication Data

US 2010/0180954 A1 Jul. 22, 2010

Related U.S. Application Data

(60) Provisional application No. 61/205,245, filed on Jan. 17, 2009.

(51) Int. Cl.
| G05D 7/00 | (2006.01) |
| G05D 3/12 | (2006.01) |
| F17D 1/16 | (2006.01) |
| F16K 17/36 | (2006.01) |
| G01V 3/00 | (2006.01) |
| F16K 31/12 | (2006.01) |
| F16K 51/00 | (2006.01) |
| G08C 19/60 | (2006.01) |

(52) U.S. Cl.
USPC ............ 700/282; 700/289; 137/14; 137/38; 137/47; 340/853.1; 340/870.01; 251/12; 251/142; 251/289

(58) Field of Classification Search
USPC ............ 137/14–15, 21–4, 38, 47, 174, 178, 137/274, 455, 803; 251/12, 14, 142, 289, 251/304, 339; 700/3, 9, 12–13, 19, 282, 289; 702/45, 50, 100, 138; 340/853, 870.01
See application file for complete search history.

(56) References Cited

U.S. PATENT DOCUMENTS

| 3,677,001 | A | * | 7/1972 | Childers et al. ................. 60/398 |
| 3,827,669 | A | * | 8/1974 | Rodgers .......................... 251/62 |
| 4,200,911 | A | * | 4/1980 | Matsumoto ..................... 700/28 |
| 5,504,693 | A | * | 4/1996 | Elliott et al. .................. 700/282 |
| 5,577,532 | A | * | 11/1996 | Palmer .......................... 137/460 |
| 6,701,223 | B1 | * | 3/2004 | Rachford et al. ............. 700/301 |
| 7,702,478 | B2 | * | 4/2010 | Hedtke et al. ................ 702/100 |
| 7,890,216 | B2 | * | 2/2011 | Boger et al. .................. 700/282 |
| 2002/0147503 | A1 | * | 10/2002 | Osburn, III ....................... 700/9 |
| 2002/0161866 | A1 | * | 10/2002 | Tozer et al. .................... 709/220 |
| 2002/0188382 | A1 | * | 12/2002 | Sherwood ...................... 700/282 |
| 2003/0167919 | A1 | * | 9/2003 | Schempf ......................... 95/15 |
| 2005/0252278 | A1 | * | 11/2005 | Bryant et al. ................... 73/49.5 |
| 2006/0009881 | A1 | * | 1/2006 | Ferber et al. ................... 700/282 |

(Continued)

*Primary Examiner* — Sean Shechtman
*Assistant Examiner* — Darrin Dunn
(74) *Attorney, Agent, or Firm* — Darcell Walker

(57) ABSTRACT

A self-contained valve actuator of the present invention can comprise an actuator component. This actuator can be linear or quarter turn depending on the valve. The actuator can be double acting which means the piston will move once to open and once to close. The self-contained valve system uses hydraulic fluid to operate the valve. The valve system is directly powered with electric power from a battery. Solar panels are also incorporated to capture solar energy and convert this energy into electrical energy. This converted electrical energy is stored in the battery which enables the battery to continuously supply energy while substantially reducing the possibility of exhausting battery power. This resupply of electrical energy and the use of the hydraulic fluid creates a self-contained valve actuation system.

11 Claims, 8 Drawing Sheets

U.S. PATENT DOCUMENTS

| | | | |
|---|---|---|---|
| 2006/0244424 A1* | 11/2006 | Nelson | 322/37 |
| 2007/0175640 A1* | 8/2007 | Atencio et al. | 166/369 |
| 2008/0125884 A1* | 5/2008 | Schumacher et al. | 700/79 |
| 2009/0088906 A1* | 4/2009 | Minervini et al. | 700/282 |
| 2010/0051110 A1* | 3/2010 | Ocondi | 137/2 |
| 2011/0178644 A1* | 7/2011 | Picton | 700/282 |

* cited by examiner

AUTOMATED VALVE WITH SELF-CONTAINED VALVE ACTUATOR SYSTEM

CROSS-REFERENCE TO RELATED APPLICATIONS

This application is related to and claims priority from provisional patent application No. 61/205,245 filed on Jan. 17, 2009, the contents of which are incorporated herein by reference.

FIELD OF THE INVENTION

This invention relates to an automated valve control system which enables control and operation of a valve from a remote location and in particular to a self contained valve actuation system for remotely controlling the opening and closing of a valve. The self-contained valve actuation system comprises components for independently supplying power to the actuator, sensors for monitoring the flow of material through a flowline and software for controlling the position of the valve based on information obtained from the valve sensors.

BACKGROUND OF THE INVENTION

Pipeline transport is the transportation of goods through a pipe. This form of transportation is crucial to shipment of products and the prompt and efficient provision of products consumers. Liquids and gases are the most common substances sent through a pipeline. FIG. 1 shows a schematic of the general operation of a pipeline. Pipeline networks are composed of several pieces of equipment that operate together to move products from location to location. The main elements of a pipeline system are shown in FIG. 1. The first component is the initial injections station 100. Known also as supply or inlet station, the initial injections station is the beginning of the system, where the product is injected into the line. Storage facilities, pumps or compressors are usually located at these locations. The compressor/pump stations 102 are pumps for liquid pipelines and compressors for gas pipelines, are located along the line to move the product through the pipeline. The location of these stations is defined by the topography of the terrain, the type of product being transported, or operational conditions of the network. The Partial delivery station 104 known also as an intermediate station allows the pipeline operator to deliver part of the product being transported. The Block valve stations 106 are the first line of protection for pipelines. With these valves the operator can isolate any segment of the line for maintenance work or isolate a rupture or leak. Block valve stations are usually located every 20 to 30 miles (48 km), depending on the type of pipeline. Even though it is not a design rule, it is a very usual practice in liquid pipelines. The location of these stations depends exclusively on the nature of the product being transported, the trajectory of the pipeline and/or the operational conditions of the line. The Regulator station is a special type of valve station, where the operator can release some of the pressure from the line. Regulators are usually located at the downhill side of a peak. Last, the final delivery station 108 known also as outlet stations or terminal this is where the product will be distributed to the consumer. It could be a tank terminal for liquid pipelines or a connection to a distribution network for gas pipelines.

FIG. 2 is an illustration of a pipeline system. As shown, when a pipeline is built, the construction project not only covers the civil work to lay the pipeline 200 and build the pump/compressor stations and control valves, it also has to cover all the work related to the installation of the field devices that will support remote operation. Field device instrumentation gathers data. The field instrumentation includes flow (O), pressure (P) and temperature (T) gauges/transmitters, and other devices to measure the relevant data required. These instruments are installed along the pipeline on some specific locations, such as injection or delivery stations, pump stations (liquid pipelines) or compressor stations (gas pipelines), and block valve stations 202. The information measured by these field instruments is then gathered in local Remote Terminal Units (RTU) 204 that transfer the field data to a central location 206 in real time using communication systems, such as satellite channels 208, microwave links, or cellular phone connections. Pipelines are controlled and operated remotely, from what is usually known as The Main Control Room 206. In this center, all the data related to field measurement is consolidated in one central database. The data is received from multiple RTUs along the pipeline. It is common to find RTUs installed at every station along the pipeline.

The SCADA system (supervisory control and data acquisition) is an industrial control system: a computer system monitoring and controlling a process. The SCADA is located at the Main Control Room 206 and receives all the field data and presents it to the pipeline operator through a set of screens or Human Machine Interface, showing the operational conditions of the pipeline. The operator can monitor the hydraulic conditions of the line, as well as send operational commands (open/close valves, turn on/off compressors or pumps, change set points, etc.) through the SCADA system to the field. To optimize and secure the operation of these assets, some pipeline companies are using what are called Advanced Pipeline Applications, which are software tools installed on top of the SCADA system, that provide extended functionality to perform leak detection, leak location, batch tracking (liquid lines), pig tracking, composition tracking, predictive modeling, look ahead modeling, operator training and more.

The primary component in a pipeline used to control the flow of substances through a pipeline is the valve. A valve is a mechanical device, which opens and closes in order to control the flow of materials, such as water, stream, oil, and gas chemicals, in flow lines such as pipes and vessels. Valves are used in a wide variety of familiar devices and many known tasks. For example, turning a dial on a gas stove varies the opening of a valve and regulates the flow of gas to the stove burner. The valve in an automobile tire allows air to enter but not to leave the tire. Valves in a steam radiator permit the air in the radiator to leave and the steam to take the place of air. In addition, valves may vary in size from a fraction of an inch to several feet, depending upon the diameter of the pipe or passageway. Valves are joined to a pipeline by threaded, flanged, or welded joints.

Some conventional valves consist of two main sections that form the valve housing/body: the bonnet section and the body section. The features of a conventional valve also include inlet and outlet openings to enable materials to flow through into, through and out of the valve. The valve also includes a restriction component (often referred to as a plug) that can be positioned in the area between the inlet and outlet opening to partially or totally restrict the flow of materials through the valve and thereby affect the flow rate and pressure of the materials. The fourth feature of the valve comprises an actuation mechanism to control the positioning of the restriction component between the two openings. Valve operators usually adjust the position of the restriction component through the actuation mechanism.

Valves fall into two broad types: linear and rotary. In a linear valve, the disc/plug lifts from the seat and moves in a direction that is perpendicular to the seat. By comparison, in a rotary valve such as a ball valve the disc rotates in the seat. A traditional type of linear valve called a gate valve. This valve has a stem and plug that moves in an up and down linear directions. A wheel connects to the stem. The operator rotates the wheel in one circular direction (usually clockwise) to lower the plug into the flowline. Rotating the wheel in the opposite circular direction will cause the stem to move upward and thereby raising the plug out of the flowline. The valve also contains a bonnet and a body that form the valve housing.

Control valves can be operated through various methods. The oldest and most basic method of operating a control valve is through manual control. With manual control an operator physically adjust the valve. A second form of valve control is with electronic controls that are manually operated. The operator uses an electronic device to adjust the valve instead of manually adjusting the valve. A third form of control is remote automatic control. Pipelines can have lengths of several thousands of miles. These pipelines contain control valves positioned at various locations in the pipeline. In rural areas, control valves may be approximately 25 miles apart. In more urban areas, pipelines may be approximately 5 miles apart. Because of the positions of the control valves, the optimum method to control valves is through remote automated control.

Currently, automated valve control systems exist. These control systems contain sensors that detect and transmit valve data and software programs that interpret the censored data and transmit commands that adjust and control the position of the valves as needed based on the interpreted data. These remote control valves are powered with battery power or have remote power stations in close proximity to the control valve. Although current valve control systems provide a means to regulate the flow of substances through a pipeline, the current methods and systems for powering the valves can be inefficient and unreliable. Valve control systems must to be able to function instantaneously even after being inactive for substantial periods of time. In addition, these systems must be able to properly function without the assistance or operation of human personnel. Further, the power needed to operate the valves must be sufficient at all times and must also be reliable.

Although valve control systems currently exist, there remains a need for a self-contain valve control system with an independent and sufficient power source and the capabilities to be internally operated in response to pipeline condition changes.

SUMMARY OF THE INVENTION

The present invention is an actuator used to open and close valves. This invention can be installed in multi-turn valves such as gate valves, globe valves and in quarter-turn valves such as ball valves, and plug valves. The invention is a high pressure, hydraulically-operated actuator. However, the invention is a self-contained actuator. It is self-contained because it generates and stores its own hydraulic power. It does not require external power operate. This valve actuator has applications in valves used in oil and gas processes. This actuator can be used in places where power is not available such as remote pipelines or unmanned satellite oil platforms.

The self-contained valve actuator of the present invention can comprise an actuator component. This actuator can be linear or quarter turn depending on the valve. The actuator can be double acting which means the piston will move once to open and once to close. It can consist of a control package for local/manual control, a manual override to manually operate the actuator when power is lost and a position transmitter with a 4-20 ma signal. It can also consist of two speed control valves to regulate the opening/closing time of the actuator and a double locking valve to keep the actuator in its last position once power is lost. In addition, the actuator can have a flag type visual indicator that will indicate the position of the valve. Another component in this system can be a hydraulic tank. The hydraulic tank can be a stainless steel enclosure located between the valve and the actuator. The hydraulic tank will contain hydraulic fluid. The tank can also have a mechanical partial stroke device. This device allows the operator to manually open the valve to a predetermined percentage, usually 20% open. A critical component of the present invention is the Hydraulic Power Unit (HPU). The HPU is a stainless steel cabinet mounted on the side of the actuator. The HPU is made up of one or more hydraulic accumulators depending on the size of the valve and the amount of hydraulic fluid needed to operate the actuator. It is also made up of an electric motor and pump, two solenoid valves and one hydraulic hand pump. The purpose of the HPU is to generate hydraulic power to operate the valve as many times as required by the operator.

A main feature of the present invention is an Uninterrupted Power System (UPS). This system is composed of a stainless steel cabinet mounted on the side of the actuator containing batteries and solar panel(s). The batteries and solar panels will create a back-up system to power up the solenoids, and the motor. The number of batteries and solar panels depends on the size of the valve/actuator.

DETAILED DESCRIPTION OF THE INVENTION

The present invention provides a self-powered self-actuated valve system for controlling the flow of materials through a flowline. In the system of the present invention, the valve actuator stores its own power and allows for the remote wireless control of the valve. This feature makes the present invention ideal for use in applications where power is not available or is unreliable. This system is also self contained which means it does not rely on any external resources for operation. The self-contained feature system guarantees multiple operations of the actuator. In addition, the system of the present invention has minimal tubing which reduces leakage points and makes it virtually zero-leakage. The modular of this system also allows for future upgrades. In addition, the configuration and features of the present invention is applicable for both quarter turn and linear valves.

Figure 1:
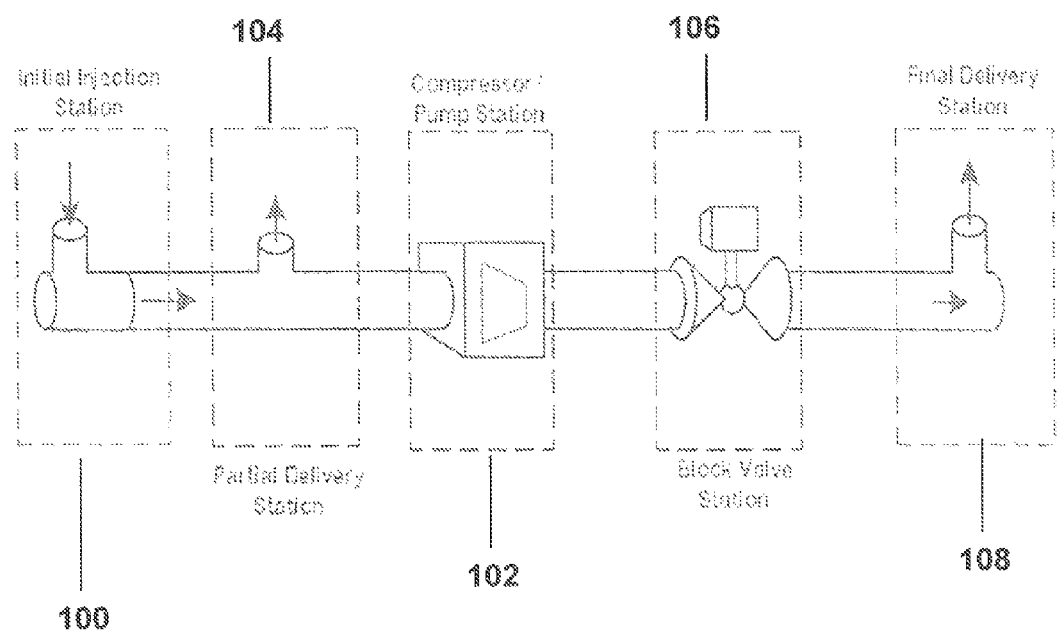
FIG. 1 is a schematic of a conventional pipeline.
Figure 2:
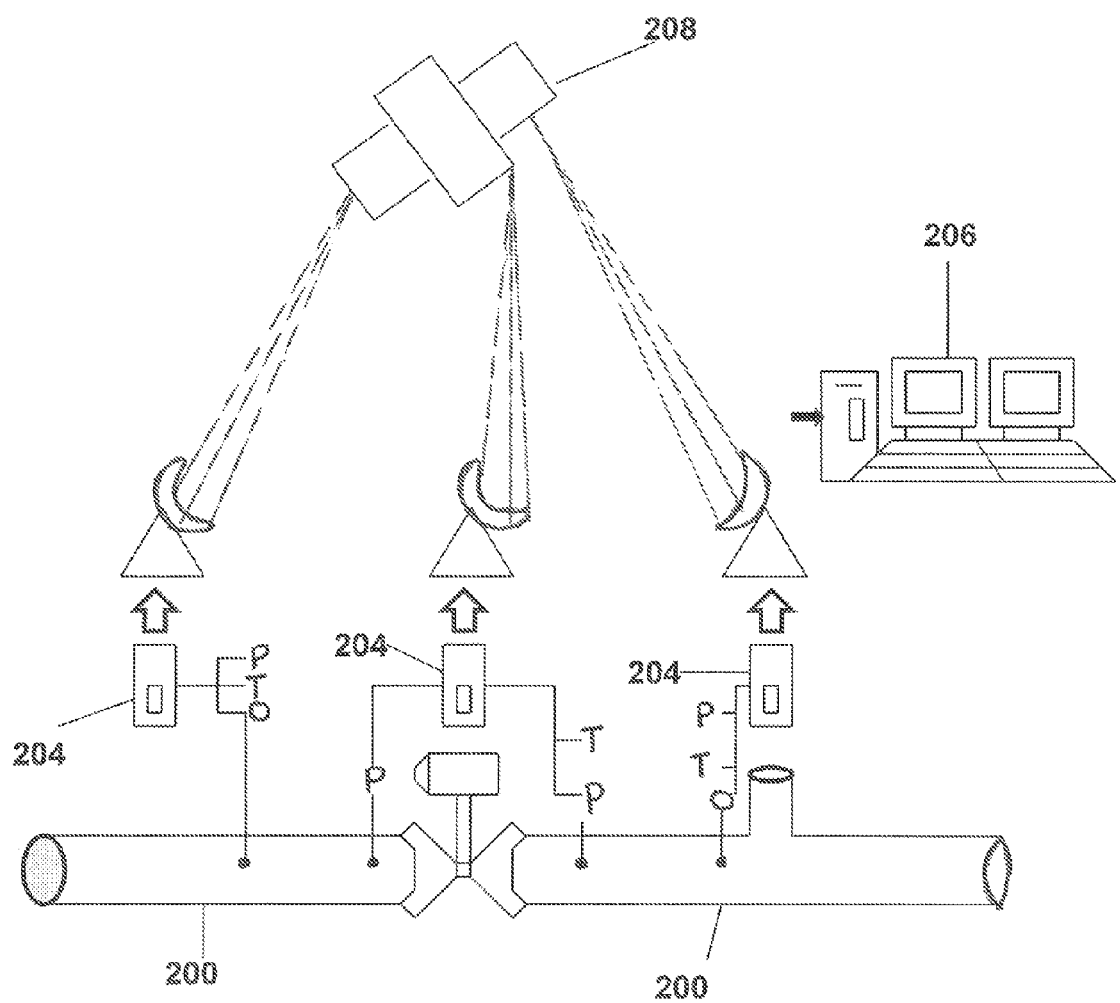
FIG. 2 is an overview of a conventional pipeline containing monitoring instrumentation, a control valve, recording equipment and an information transmission system.
Figure 3:
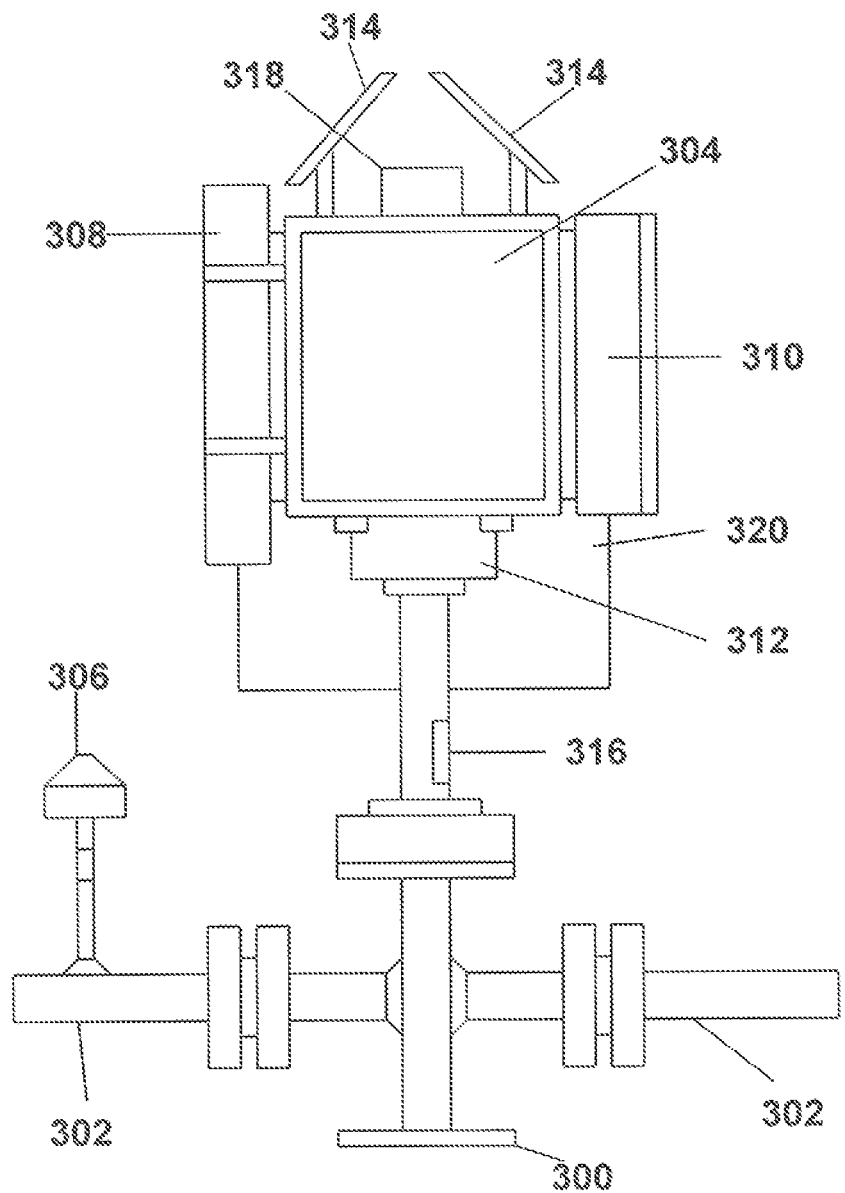
FIG. 3 is a view of the self-actuation valve control system of the present invention for a linear control valve.

Referring the FIG. 3, shown is a configuration of the system of the present invention for a linear valve system. The system has as its basic component a gate valve 300. This valve is positioned in pipeline 302. The gate valve 300 is controlled by self-powered actuator of the present invention. This actuator system comprises a SCADA system 304 which processes flow data from the pipeline. The SCADA system also comprises a PLC unit, a RTU (Remote Terminal Unit) Radio and a terminal board. Wireless radio pressure transducers 306 detect various flow conditions such as temperature and pressure of the pipeline and pipeline contents. This information is transmitted to the SCADA system 304.

The actual physical control of the valve is accomplished through a hydraulic control system. This hydraulic system comprises a hydraulic accumulator 308 which contains hydraulic fluid, a hydraulic pump 310 and a hydraulic oil tank bladder 312 that serves as a reservoir or overflow for hydraulic fluid from the hydraulic accumulator 308. The hydraulic pump 310 further comprises a 24 vdc. electric motor. The hydraulic pump also comprises pressure switches, a manifold valve that can open and close and a solenoid valve. In the operation of the present invention, the movement of the valve is controlled through the pressure applied to the hydraulic fluid. In addition, a preferred configuration of the present invention is to have the system components including the hydraulic pump 310, the SCADA system 304, the hydraulic accumulator 308 and the hydraulic tank 312 arranged such that the center of gravity for the system is located in the center of the system and along of the same vertical line as the valve 300. This type of configuration helps stabilize the system and reduces movement of the system resulting from environmental forces such as wind.

A critical component of the present invention is the system used to supply power. In addition to the hydraulic pump and hydraulic accumulator, electrical power supplied from a battery. This battery stores the power and provides the power to operate the hydraulic pump. In addition to the battery, solar panels 314 are positioned on the SCADA 304. These solar panels gather solar energy from the sun and convert this energy into electrical energy that is stored in the battery. The ability to continuously accumulate energy will keep the battery charged and substantially reduce the possibility of exhausting the power supply to the hydraulic pump system. This ability to continuously provide power without the need for human intervention is a feature that provides a great benefit to pipeline operators. This feature also provides reliability by reducing pipeline failure related to power failures. This configuration also illustrates a linear position indicator 316 and a micro pulse linear position transducer 318 that detects and transmits the position of the valve. This valve position is important to regulating the flow of the contents in the pipeline. An explosive-proof enclosure 320 protects the battery and solenoid valve.

Figures 4A, 4B:
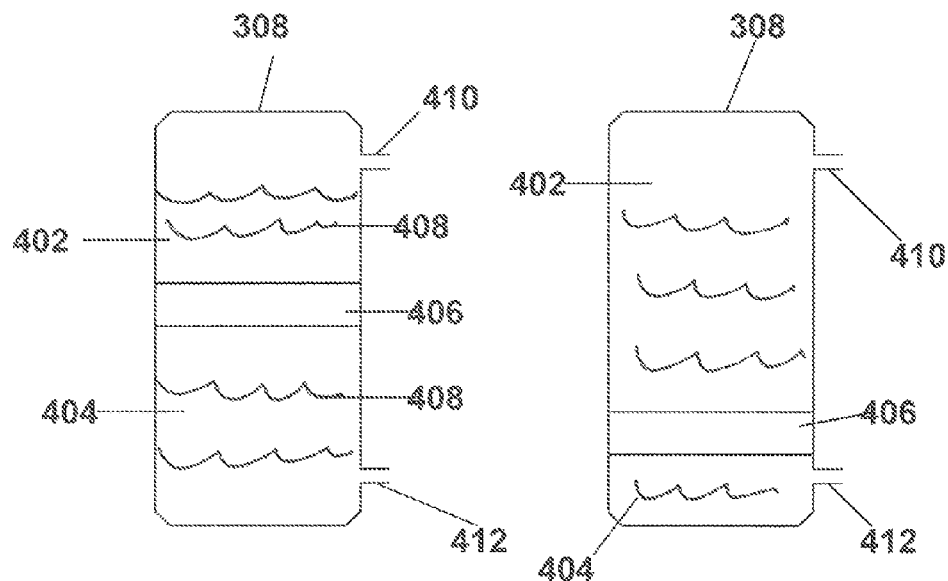
FIG. 4 is a view of an internal configuration of the accumulator component of the self-actuation valve control system of the present invention.

FIGS. 4a and 4b show an internal configuration of the hydraulic accumulator 308 of the present invention. As shown, the hydraulic accumulator is a tank that can have two sections 402 and 404 that are separated by a piston 406. Each section of the accumulator contains hydraulic fluid 408. Each section also has an opening 410 and 412. These connect the hydraulic accumulator 308 to the valve actuator and to the hydraulic tank 312. The movement of the piston 406 in either direction moves the hydraulic fluid and thereby increases pressure in the direction of the piston movement. Referring to FIG. 4b, shown is the piston 406 in a position close to the opening 412 that connects the accumulator with the hydraulic tank 312. With piston in this position, there is less pressure on the hydraulic fluid going to the valve actuator. This configuration could be the position when the valve is completely opened. An alternate configuration of the accumulator can have the piston 406 with fluid on one side of the piston and air on the other side of the piston. Hydraulic fluid can move the piston in the direction of the air to compress the air and create pressure on the fluid in the hydraulic pump. The increased pressure will provide movement via the actuator to adjust the valve as desired.

Figure 5:
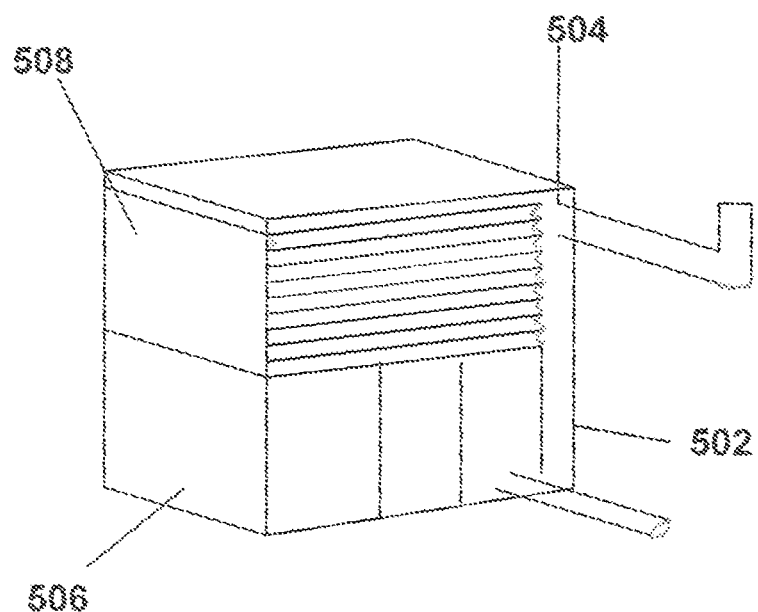
FIG. 5 is a view of the internal configuration of the hydraulic tank component of the self-actuation valve control system of the present invention.

FIG. 5 shows a configuration of the hydraulic tank 312 of the present invention. As shown, this tank is an enclosure 502 with an inflatable diaphragm 504 positioned in the enclosure. The primary function of the hydraulic tank is to serve as an overflow or outlet for hydraulic fluid from the hydraulic accumulator. The diaphragm divides the hydraulic tank into sections 506 and 508. In convention tanks, air mixes with the operation fluid. Moisture from the air contaminates the operations fluid. The conventional solution is to absorb the moisture and filter it to the atmosphere. The approach in the implementation of the present invention is to isolate the fluid with the expandable bladder tank. Other features of the hydraulic oil tank include a bladder vent, tank access plate, manifold mounting plate, valve mounting flange, an oil return opening, a low oil level switch and an oil level and temperature sight glass. The hydraulic tank also contains an oil fill inlet.

Figure 6:
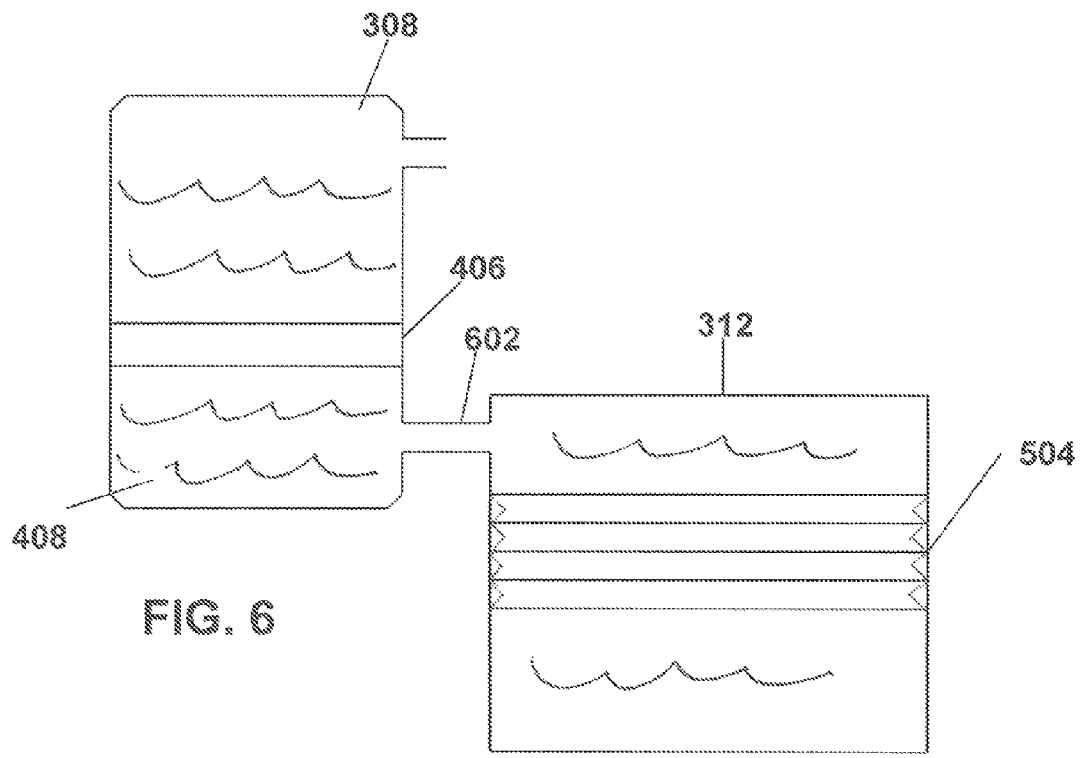
FIG. 6 is a view of the relationship between the hydraulic accumulator and the hydraulic tank components of the system of the present invention.

FIG. 6 shows the relationship between the hydraulic accumulator 308 and the hydraulic tank 312. As the piston 406 moves downward, hydraulic fluid 408 is under increased pressure forcing the fluid through the channel 602 and into the hydraulic tank 312. As the fluid moves into the hydraulic tank 312, the pressurized fluid forces the diaphragm will compress to allow more fluid to enter into the tank.

Figure 7A:
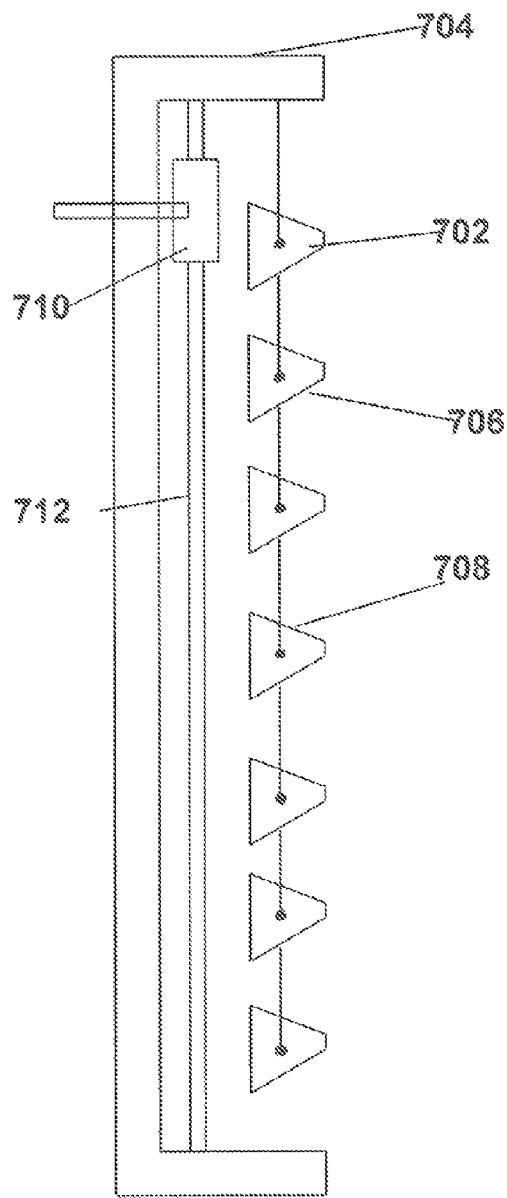
FIGS. 7a and 7b are views the internal configuration of the valve position indicator of the present invention.
Figure 7B:
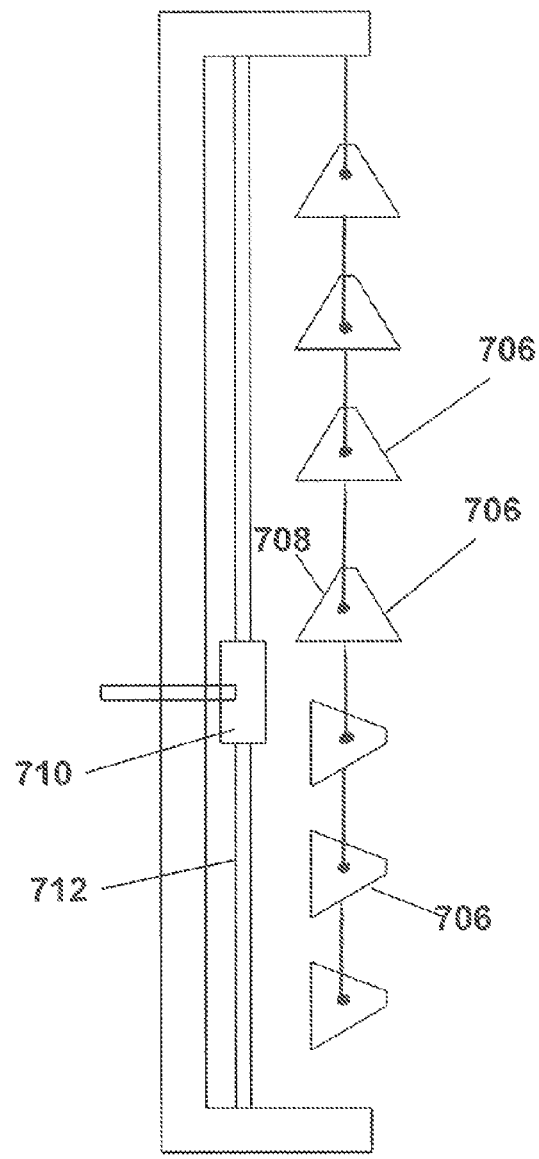

The present invention also contains a linear position indicator 316. This feature is applicable to linear valve systems. The conventional approach for indicating the position of the valve is to have an external lever. This configuration has several disadvantages which include: 1) Viewable from only 10 meters; 2) it has external moving parts and 3) the actuator stem is exposed to environment. FIGS. 7a and 7b illustrate the concept of the linear position indicator of the present invention. This approach comprises a series of rotatable sockets 702 having at least on magnetic side. These sockets are positioned on a platform 704. In this illustration both sides 706 and 708 are magnetic. In addition, one side will be colored to serve as the position indicator. For example, side 706 can be colored read and side 708 can be gray or not colored. A magnet 710 is also slidably attached to a rod 712. The magnet is capable of moving linearly along to rod. In the operation of the position indicator, as the valve moves up and down and changes position, the magnet 710 moves linearly in correspondence to the movement of the valve. The magnetic force of the magnet will cause the sockets to rotate in response to the magnetic force. In FIG. 7b, the magnet 710 has moved downward. This magnetic force related to this movement caused the first four sockets to rotate in a counter-clockwise manner. As a result, side 706 of the sockets is visible through a transparent display wall 714 of the valve position indicator. This side is colored red and is very visible to operators from a greater distance than conventional position level indicators. The advantages of this position indicator system are: 1) that the colors are viewable from at least 20 meters; 2) there are no external moving parts and 3) this system does not expose the actuator stem to the external environment.

Figure 8:
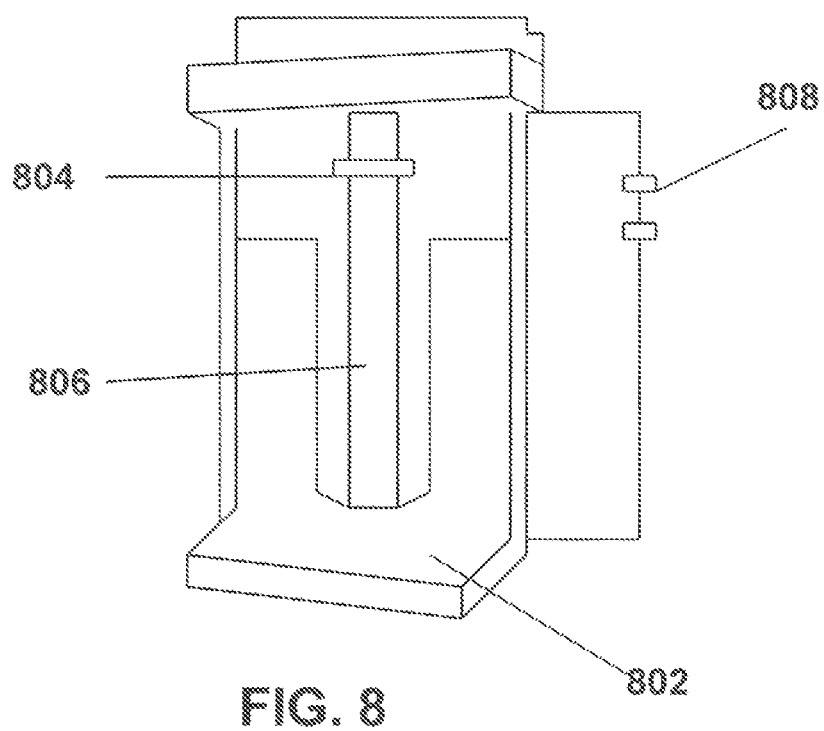
FIG. 8 is a view of the valve position transmitter.

FIG. 8 is a display of a valve position transmitter. This device can be located adjacent the hydraulic accumulator. Although the valve position indicator of FIGS. 7a and 7b provide an improvement, these improvements are only if an operator is in close proximity to the valve. For persons that are in remote locations, the valve position transmitter can send information that conveys to the operators the position of the valve. This valve position transmitter also provides features not in conventional position indicators. These features include: 1) no exposed moving parts; 2) easily replaced; 3) integrated into actuator; 4) no contact to fluid and 5) wear free magnet technology. In FIG. 8, shown is a view of the valve position transmitter of the present invention. The transmitter has a platform 802 with a linear rod 804 extending basically the length of the platform. A position indicator 806 is positioned around the rod 804 and moves along the rod 806. The movement of the position indicator is conveyed to sensors 808. These sensors 808 then transmit this position information to operators in remote locations.

The present invention provides a novel control manifold configuration for the system of the present invention. The traditional valve control manifold design has several challenges which create inefficiencies during valve operations. These challenges include: 1) multiple leak paths which cause oil to escape; 2) the traditional manifold design is difficult to repair; 3) traditional manifold designs are hard to access; and 5) traditional manifold designs require larger enclosures. The features of this manifold design include: pilot ports, solenoid valves, speed controls, a local auto control valve, relief valves, a power supply and filters, a regulator, a hand pump, gauges and an exhaust. The manifold design for the present invention has enhancements that overcome the challenges of the traditional manifold design. The features of the manifold design of the present invention include: 1) minimal leak paths; 2) this manifold design is easy to repair; 3) this manifold design has easy access to controls and 4) this manifold design reduces enclosure size.

Figure 9:
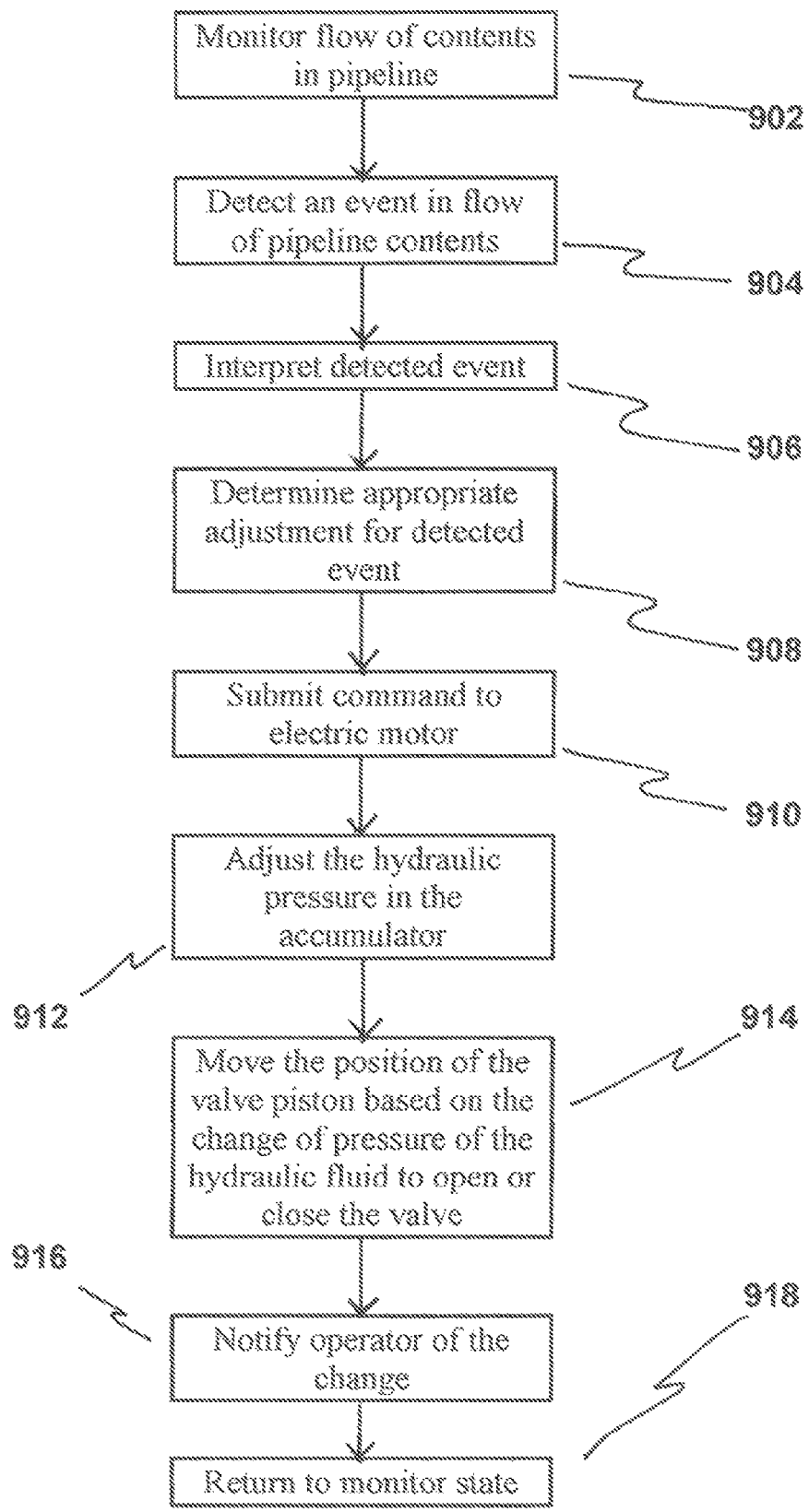
FIG. 9 is a flow diagram of the method of implementation of the system of the present invention.

FIG. 9 is a flow diagram of the method of implementation of the system of the present invention. In the implementation of the present invention, initial parameters are set for conditions of the pipeline. Step 902 monitors the flow of content through a pipeline. In step 904, an event is detected. This detected event is usually a change in a parameter of the content of the pipeline. This change could be for example, a change in the line or a change in the temperature in the line. Step 906 interprets the detected event and determines the actual condition change. Based on the determined conditions, step 908 determines an appropriate adjustment for the pipeline. Once the appropriate adjustment is determined, in step 910 a command is transmitted to the electronic motor. In step 912, the motor then activates the hydraulic pump that adjusts the valve as needed. This adjustment is sent to the operator in step 914. Once the adjustment has been made, the method notifies the operator in step 916. The method returns to the monitor mode of step 902 in step 918. In another embodiment of the method of the present invention, in step 908, the determined adjustment may be something that requires an operator to intervene. If the determination is that an operator is needed, a transmission is sent to the operator. The method then continues to monitor the condition and send this monitored information to the operator.

The method of this invention provides significant advantages over the current art. The invention has been described in connection with its preferred embodiments. However, it is not limited thereto. Changes, variations and modifications to the basic design may be made without departing from the inventive concepts in this invention. In addition, these changes, variations and modifications would be obvious to those skilled in the art having the benefit of the foregoing teachings. All such changes, variations and modifications are intended to be within the scope of this invention.

I claim:

1. An automated valve control system having a self-contained valve actuator and a self-contained power generating source comprising:

a valve positioned in a flowline for altering a flowline volume in order to affect a flow of content in the flowline;

an actuator means connected to said valve, said actuator means being a valve positioned in the flow in order to affect the flow of the content of the flowline;

one or more sensors positioned in the flowline to measure various parameters of the flowline and flowline content;

a hydraulic fluid for supplying power to said actuator means to enable said actuator means to change positions of the valve in the flowline;

a hydraulic pump for supplying pressure to said hydraulic fluid thereby generating power to said actuator means;

an information processing module, at the remote location of the positioned self contained valve actuator, said information processing module being in communication with said one or more sensors and with said hydraulic pump, said information processor module containing software programs capable of processing information received at the processing module from said one or more sensors and capable of transmitting control commands to said hydraulic pump;

a valve position indicator, said valve position indicator being positioned along said actuator means, said valve position indicating means capable of visually displaying a current position of position of the valve in the flowline, and said valve position indicator comprising:

a housing having an upper end section and a lower section and a linear central section connected to both said upper end section and said lower end sections, both said upper end section and said lower end section further comprises a front end and to back end of said back end being attached to said linear central section of said housing;

a linear rod attached to said housing, extending the length of said housing and attached to said upper end section and said lower end section and positioned parallel to said linear central section;

a slidable magnetic element attached to said linear rod, the slidable magnetic element capable of moving along said linear rod in response to a change in the position of the value;

a plurality of multiple sided level indicator sockets positioned adjacent each other and forming a linear configuration; and a transparent surface attached to the housing the front ends of said upper end section and said lower end sections of the housing for protecting and display said level indicator sockets;

a power supply for supplying electrical power to said processing module; and a power generating module connected to said power source for replenishing electrical power in said power source.

2. The self-actuating valve control system as described in claim 1 wherein said power source is a rechargeable battery source.

3. The self-actuating valve control system as described in claim 2 wherein said power generating module further comprises one or more solar panels.

4. The self-actuating valve control system as described in claim 3 further comprising a power conversion module for converting solar power into electrical power.

5. The self-actuating valve control system as described in claim 4 further comprising a power level monitor to determine when power in the power supply has reached predefined power threshold levels.

6. The self-actuating valve control system as described in claim 1 father comprising a hydraulic accumulator for containing the hydraulic fluid and supplying the hydraulic fluid the actuator means through the hydraulic pump.

7. The self-actuating valve control system as described in claim 6 further comprising a hydraulic tank connected to said hydraulic accumulator for storing hydraulic fluid from said hydraulic accumulator and supplying hydraulic fluid to said hydraulic accumulator 8. The self-actuating valve control system as described in claim 1 wherein said hydraulic pump is powered through an electronic motor.

9. The self-actuating valve control system as described in claim 7 wherein said hydraulic tank further comprising a diaphragm in said hydraulic tank to isolate the hydraulic fluid from air contaminants.

10. The self-actuating valve control system as described in claim 1 further comprising valve control instrumentation for detecting and transmitting valve actuator control information and for receiving valve control information from another location, said valve control instrumentation be positioned on the self-actuating valve control system and being enclosed such that said valve control instrumentation is protected from environmental elements and such that said valve control instrumentation is secured from vandalism or theft.

11. The self-actuating valve control system as described in claim 1 wherein said self-activating valve control system components including said actuator means, hydraulic pump, processing module, power supply, power generating module, power conversion module, power level indicator, hydraulic accumulator and hydraulic tank are configured and positioned in relationship to each other on said self-actuating valve control system such that a gravitational center for said self-actuating valve control system is maintained in the center of the configuration of the system components such that physical stability of the self-actuating valve control system is maintained regardless of environmental conditions.

* * * * *